US012773974B2

(12) United States Patent
Lim

(10) Patent No.: US 12,773,974 B2
(45) Date of Patent: Oct. 27, 2026

(54) ACTUATOR UNIT AND ELECTRO-MECHANICAL DRUM BRAKE INCLUDING THE SAME

(71) Applicant: HL MANDO CORPORATION, Gyeonggi-do (KR)

(72) Inventor: Woochul Lim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 306 days.

(21) Appl. No.: 18/401,334

(22) Filed: Dec. 30, 2023

(65) Prior Publication Data

US 2025/0010836 A1 Jan. 9, 2025

(30) Foreign Application Priority Data

Jul. 7, 2023 (KR) ........................ 10-2023-0088479

(51) Int. Cl.
*B60T 13/74* (2006.01)
*F16D 51/22* (2006.01)
(Continued)

(52) U.S. Cl.
CPC ............ *B60T 13/746* (2013.01); *F16D 51/22* (2013.01); *F16D 65/22* (2013.01); *B60T 1/067* (2013.01);
(Continued)

(58) Field of Classification Search
CPC ...... B60T 13/746; B60T 13/741; B60T 1/067; F16D 51/22; F16D 51/18; F16D 65/22;
(Continued)

(56) References Cited

U.S. PATENT DOCUMENTS 4,701,061 A * 10/1987 Stubbersfield .......... F16C 19/54 384/560
2012/0181137 A1* 7/2012 Yamasaki ............... F16D 65/18 475/149
2018/0345937 A1 12/2018 Winkler et al.

FOREIGN PATENT DOCUMENTS

DE 102021206431 A1 * 12/2021 ............ B60T 13/746
KR 10-2006-0134454 12/2006
(Continued)

OTHER PUBLICATIONS

Office Action (1st) dated Aug. 3, 2026 for Korean Patent Application No. 10-2023-0088479 and its English translation provided by Applicant's foreign counsel.

*Primary Examiner* — David R Morris
(74) *Attorney, Agent, or Firm* — WOMBLE BOND DICKINSON (US) LLP

(57) ABSTRACT

An actuator unit includes a front housing including a worm shaft engagement provided with a worm shaft insertion hole on a back surface and protruding forward therefrom, a first bearing receiving portion extending to a rear side of the worm shaft insertion hole, a worm shaft support engagement extending to a rear side of the first bearing receiving portion, and a cylinder portion disposed on a lower side of the worm shaft engagement, a rear housing provided with a motor embedded portion and engaged with the front housing, a motor, a worm shaft including a first bearing disposed between an outer surface and the first bearing receiving portion and a worm disposed on a front end side and coupled to the worm shaft engagement, an actuating portion including a pair of actuating pistons embedded in the cylinder portion, and a worm shaft support coupled to the worm shaft support engagement.

19 Claims, 5 Drawing Sheets

(51) Int. Cl.

| | |
|---|---|
| ***F16D 65/22*** | (2006.01) |
| *B60T 1/06* | (2006.01) |
| *F16D 121/24* | (2012.01) |
| *F16D 125/52* | (2012.01) |

(52) U.S. Cl.
CPC ...... *F16D 2121/24* (2013.01); *F16D 2125/52* (2013.01)

(58) Field of Classification Search
CPC ............. F16D 2121/24; F16D 2125/52; F16D 2125/06; F16C 19/04; F16C 19/24
See application file for complete search history.

(56) References Cited

FOREIGN PATENT DOCUMENTS

| | | |
|---|---|---|
| KR | 10-2012-0088995 | 8/2012 |
| KR | 10-2021-0063199 | 6/2021 |
| KR | 10-2021-0121490 | 10/2021 |

* cited by examiner

ACTUATOR UNIT AND ELECTRO-MECHANICAL DRUM BRAKE INCLUDING THE SAME

CROSS-REFERENCE TO RELATED APPLICATION

This application claims the benefit of Korean Patent Application No. 10-2023-0088479, filed on Jul. 7, 2023 in the Korean Intellectual Property Office, the disclosure of which is incorporated herein by reference.

BACKGROUND

1. Field

Embodiments of the present disclosure relate to an actuator unit capable of preventing a worm shaft and bearing from being disengaged from a housing under axial load, and to an electro-mechanical drum brake including the same.

2. Description of the Related Art

Generally, vehicles are equipped with a brake system for braking, and various types of brake systems have been proposed for the safety of passengers and cargo.

In conventional brake systems, when the driver presses the brake pedal, a mechanically connected booster is used to provide the necessary fluid pressure to the wheel cylinders for braking. However, in recent years, electro-mechanical brake systems (EMB) have been developed that receive the driver's braking intentions as an electrical signal and operate an electric device such as a motor to provide braking power to the vehicle.

Compared to hydraulic brakes, these electro-mechanical brakes are capable of precise control of braking force and can be operated automatically by applying an autonomous driving system, which can increase user convenience and realize advanced vehicles.

On the other hand, electro-mechanical brakes can be categorized into electro-mechanical caliper brakes, which generate braking force by pressing a disk that rotates with the wheel from both sides, and electro-mechanical drum brakes, which generate braking force by pressing the inner circumferential side of a drum that rotates with the wheel. Among them, electro-mechanical drum brakes have advantages in weight and price compared to electro-mechanical caliper brakes, and the number of vehicles applying them is gradually increasing.

In these conventional electro-mechanical drum brakes, braking force is generated from a brake shoe that is moved forward and backward to the inner circumferential side of the drum by a worm shaft that rotates by transmitting the rotational force of the motor and a worm wheel that is matched with it, but a problem often occurs that the ball bearing disposed between the worm shaft and the housing is disengaged from the housing along with the worm shaft by the axial load generated during operation between the worm shaft and the worm wheel.

In particular, these ball bearings are press-fit into the housing, and if the press-fit force is small, they are easily separated from the housing along with the worm shaft as described above, and if the press-fit force is large, the separation from the housing can be prevented to some extent, but there is a problem that the rolling efficiency is reduced.

SUMMARY

Therefore, it is an aspect of the present disclosure to provide an actuator unit capable of preventing a worm shaft and bearing from being disengaged from a housing under axial load, and to an electro-mechanical drum brake including the same.

It is another aspect of the present disclosure to provide an actuator unit capable of minimizing or eliminating a press-fit force for securing ball bearings disposed between a worm shaft and a housing, and to an electro-mechanical drum brake including the same.

Additional aspects of the disclosure will be set forth in part in the description which follows and, in part, will be obvious from the description, or may be learned by practice of the disclosure.

In accordance with one aspect of the present disclosure, an actuator unit includes a front housing including a worm shaft engagement provided with a worm shaft insertion hole on a back surface and protruding forward therefrom, a first bearing receiving portion extending to a rear side of the worm shaft insertion hole, a worm shaft support engagement extending to a rear side of the first bearing receiving portion, and a cylinder portion disposed on a lower side of the worm shaft engagement, a rear housing provided with a motor embedded portion and engaged with the front housing, a motor embedded in the motor embedded portion, a worm shaft including a first bearing disposed between an outer circumferential surface and the first bearing receiving portion and a worm disposed on a front end side and coupled to the worm shaft engagement and rotated by receiving a rotational force from the motor, an actuating portion including a pair of actuating pistons embedded in the cylinder portion and moving to opposite sides of the cylinder portion by a worm wheel transmitting a rotational force from the worm and rotating thereon, and a worm shaft support coupled to the worm shaft support engagement to support a rear surface of the first bearing.

The front housing may further include a second bearing receiving portion extending on the front side of the worm shaft engagement, and the worm shaft may further include a second bearing disposed between the outer circumferential surface of the front end side and the second bearing receiving portion.

The second bearing may further include a cylindrical roller bearing including a body press-fittingly fixed into the second bearing receiving portion, and a plurality of rollers supporting the outer circumferential surface of the front end side of the worm shaft in a longitudinal direction.

The first bearing may include a ball bearing including an outer ring secured to the first bearing seating portion, and an inner ring secured to the outer circumferential surface of the worm shaft to rotate with the worm shaft.

The worm shaft may further include a second press-fit protrusion on the outer circumferential surface with which an inner circumferential side of the inner ring of the first bearing is fixedly engaged.

The first bearing receiving portion may further include a step portion prevented from contacting a front surface of the inner ring of the first bearing.

The worm shaft support may be annularly arranged to prevent from contacting a rear surface of the inner ring of the first bearing, and be in contact with a rear surface of the outer ring of the first bearing to support the first bearing.

The worm shaft support may include a male thread disposed on an outer circumferential surface of the worm shaft support engagement for engagement with a female thread disposed on an inner circumferential surface of the worm shaft support engagement, and be screwedly engaged with the worm shaft support engagement.

The worm shaft support may further include an assembly recess located on an inner circumferential side, configured to receive a tool for screw engagement with the worm shaft support engagement.

The rear housing may further include a worm shaft receiving recess configured to receive a portion of a rear end side of the worm shaft.

The motor may further include a first gear disposed on a rotor, configured to output a rotational force of the motor, and the worm shaft may further include a second gear disposed on a rear side and rotating in engagement with the first gear.

The second gear may be press-fittingly engaged into a first press-fit protrusion disposed on the outer circumferential surface of the worm shaft, and be fixed between a support disposed on the outer circumferential surface of the worm shaft and a locking nut engaged from a rear end side of the worm shaft.

The actuator unit may further include a PCB disposed between a rear side of the worm shaft support and a front side of the first gear, the PCB may include a worm shaft through-hole spaced apart from the outer circumferential surface of the worm shaft.

The cylinder portion may include a gear hole in which a portion of an upper side of the worm wheel is disposed to engage the worm.

In accordance with another aspect of the present disclosure, an electro-mechanical drum brake with a pair of brake shoes disposed on a backplate and moving forward and backward toward an inner circumferential side of a drum, the electro-mechanical drum brake includes an actuator unit configured to move forward and backward the brake shoes to opposite sides, and at least one elastic member disposed between the brake shoes, wherein the actuator unit includes a worm shaft including a first bearing disposed between an outer circumferential side and a housing and a worm disposed on a front end side, the worm shaft being rotated by receiving a rotational force output from a motor, an actuating portion including an actuating piston rotated by a worm wheel transmitting a rotational force from the worm to move forward and backward the brake shoes, and a worm shaft support fixed to the housing to support a rear surface of the first bearing.

The first bearing may include a ball bearing including an outer ring secured between the housing and the worm shaft support, and an inner ring secured to an outer circumferential surface of the worm shaft to rotate with the worm shaft.

The worm shaft may further include a second bearing disposed between an outer circumferential surface of the front end side and the housing.

The second bearing may further include a cylindrical roller bearing including a body press-fittingly fixed into the housing, and a plurality of rollers supporting the outer circumferential surface of the front end side of the worm shaft in a longitudinal direction.

The worm shaft support may be annularly arranged and screwedly engaged with the housing by a male thread disposed on the outer circumferential surface.

The worm shaft support may further include an assembly recess located on an inner circumferential side, configured to receive a tool for screw engagement with the housing.

An actuator unit and an electro-mechanical drum brake including the same, according to the present embodiment, can improve the durability of the actuator unit for generating braking force of the electro-mechanical drum brake, as a ball bearing disposed between a worm shaft and a housing can be prevented from being disengaged from the housing together with the worm shaft by an axial load.

Since an actuator unit and an electro-mechanical drum brake including the same, according to the present embodiment, can minimize or omit press-fit force for securing a ball bearing arranged between a worm shaft and a housing, an energy efficiency of the actuator unit for generating braking force of the electro-mechanical drum brake can be improved by preventing the rolling efficiency of the ball bearing from decreasing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are presented in order to sufficiently convey the ideas of the present disclosure to a person skilled in the art to which the present disclosure belongs. The present disclosure is not limited to the embodiments shown herein and may be embodied in other forms. To clarify the present disclosure, the drawings may omit portions that are not relevant to the description, and the sizes of components may be somewhat exaggerated for easy understanding.

Figure 1:
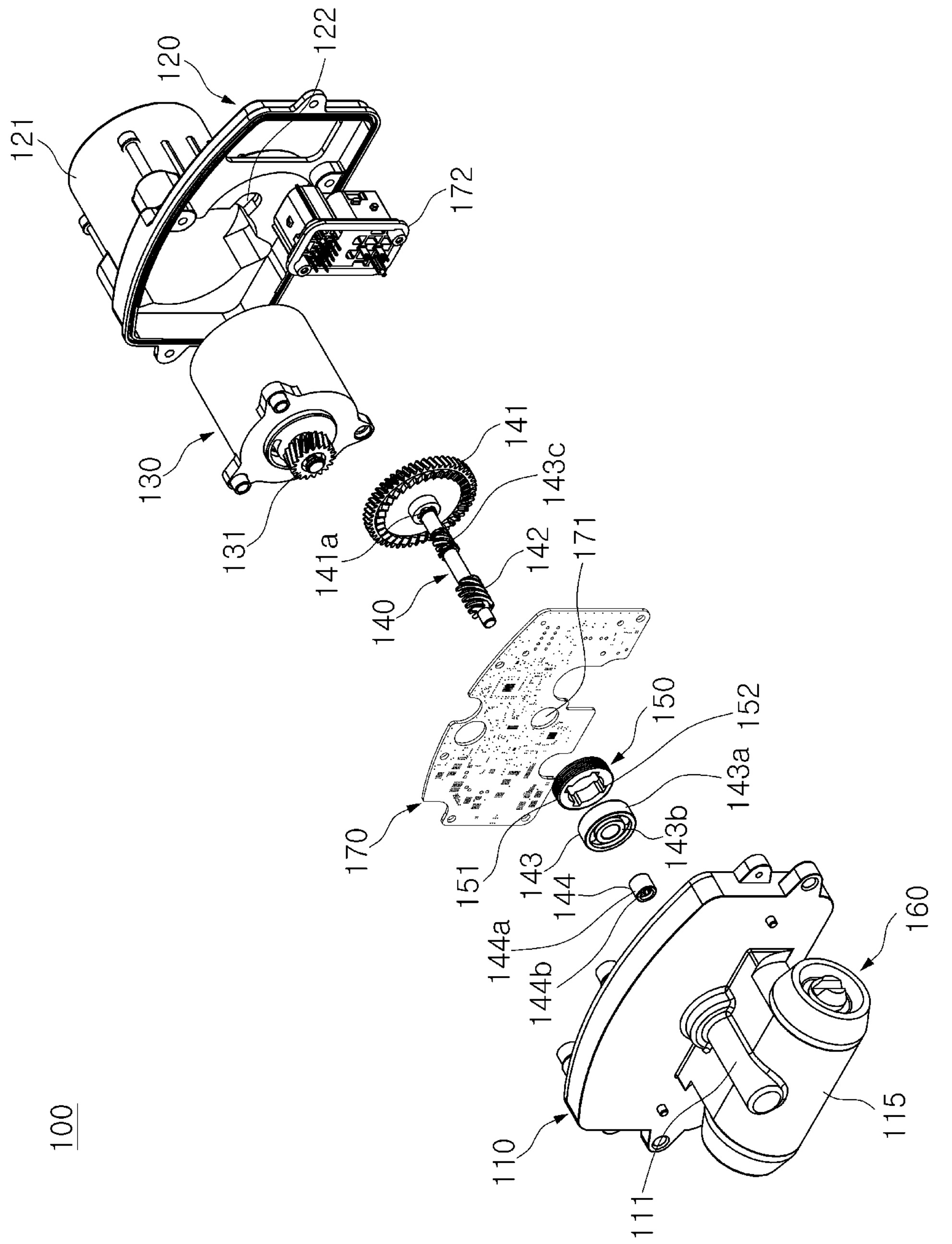
FIG. 1 is a front perspective view illustrating a disassembled state of an actuator unit according to one embodiment of the present disclosure.
Figure 2:
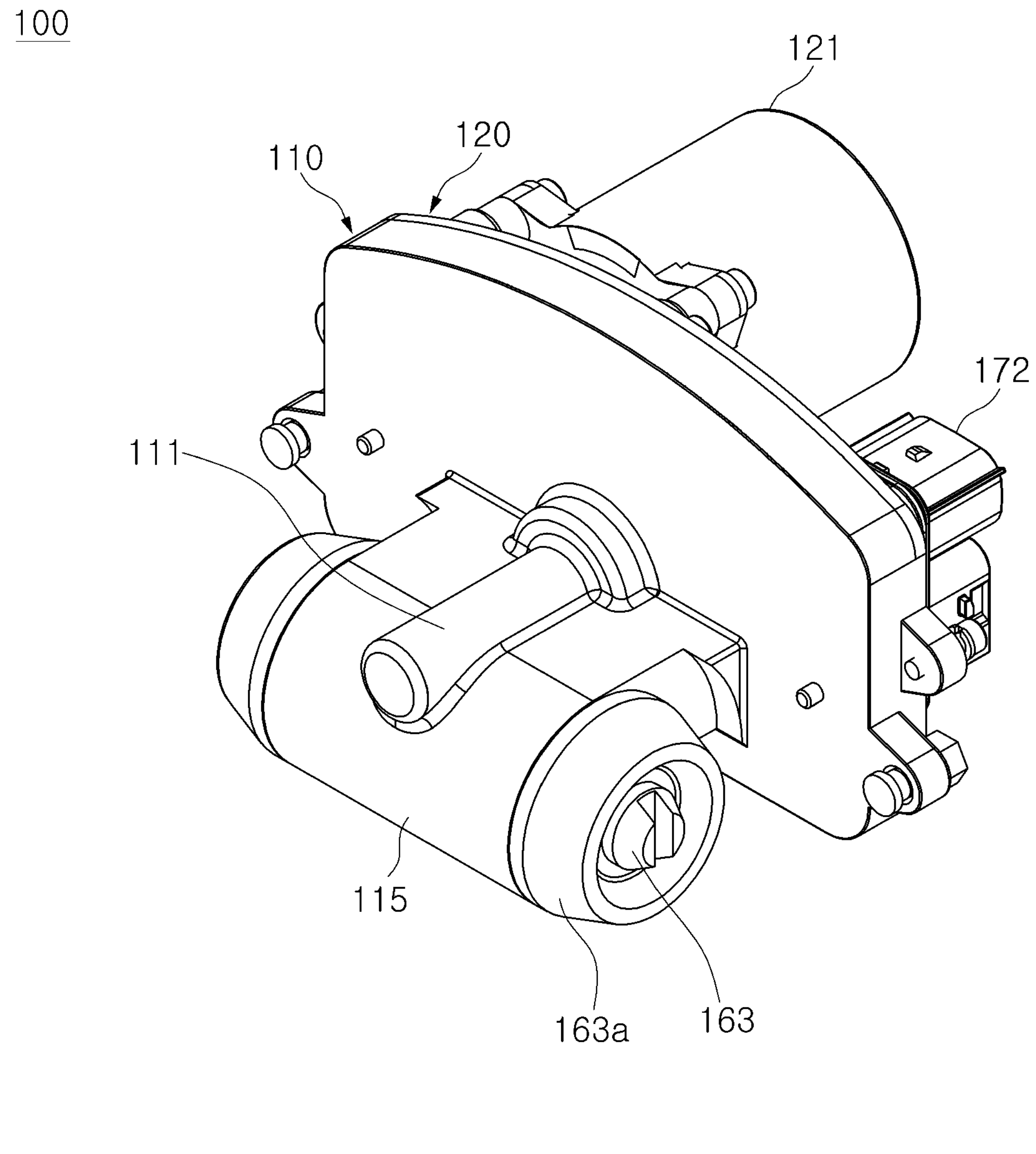
FIG. 2 is a front perspective view illustrating an assembled state of an actuator unit according to one embodiment of the present disclosure.
Figure 3:
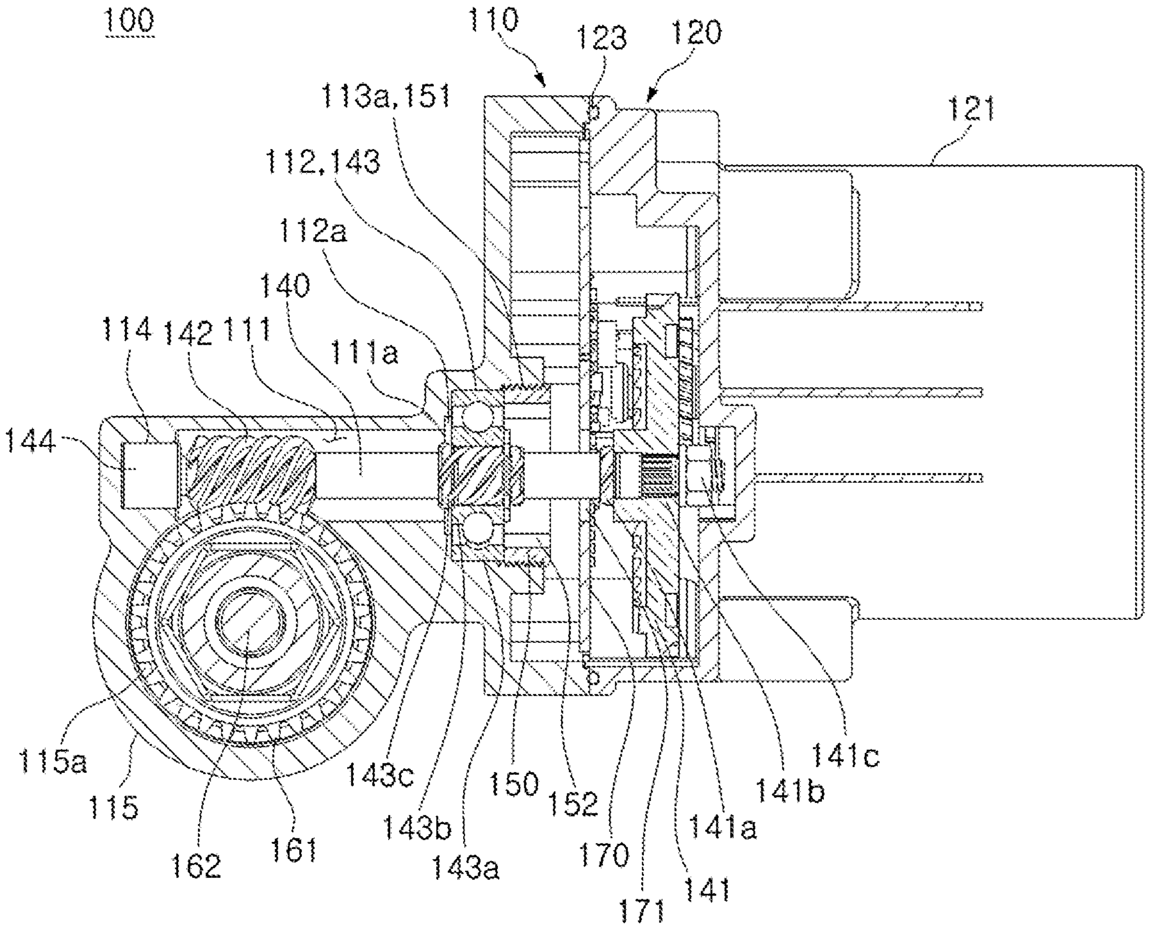
FIG. 3 is a cross-sectional view illustrating a side view of an actuator unit according to one embodiment of the present disclosure.
Figure 4:
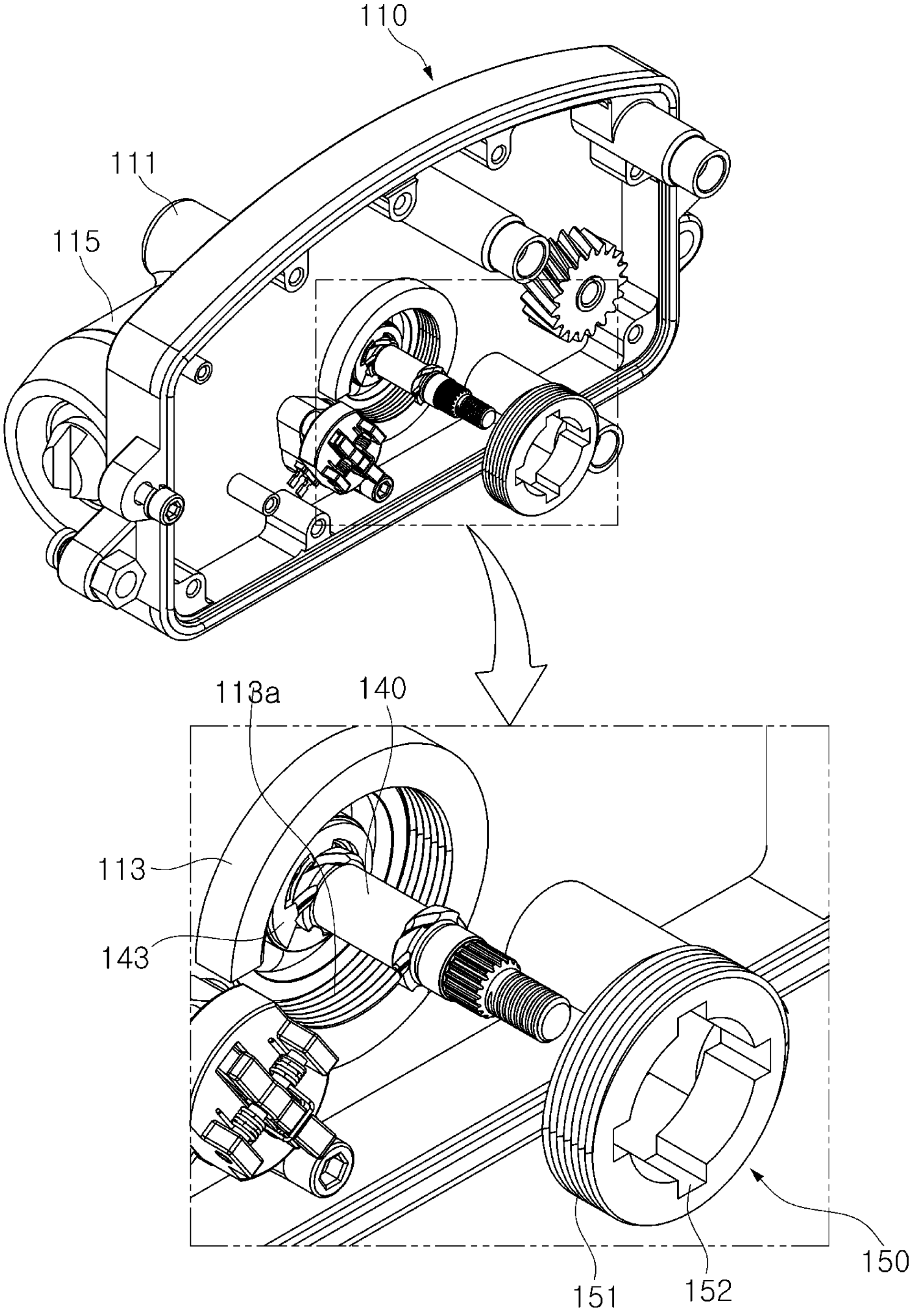
FIG. 4 is a rear perspective view illustrating an essential part of an actuator unit according to one embodiment of the present disclosure.

FIG. 1 is a front perspective view illustrating a disassembled state of an actuator unit according to one embodiment of the present disclosure, and FIG. 2 is a front perspective view illustrating an assembled state of an actuator unit according to one embodiment of the present disclosure. Also, FIG. 3 is a cross-sectional view illustrating a side view of an actuator unit according to one embodiment of the present disclosure, and FIG. 4 is a rear perspective view illustrating an essential part of an actuator unit according to one embodiment of the present disclosure.

Referring to FIGS. 1 to 4, An actuator unit 100 according to one embodiment of the present disclosure includes a front housing 110, a rear housing 120, a motor 130, a worm shaft 140, a worm shaft support 150, an actuating portion 160, and a PCB 170.

The front housing 110 includes a worm shaft engagement 111, a first bearing receiving portion 112, a worm shaft support engagement 113, a second bearing receiving portion 114, and a cylinder portion 115.

The worm shaft engagement 111 is substantially in a cylinder rod form protruding from a front side of the front housing 110 and is disposed on a back surface of the front housing 110. The worm shaft engagement 111 includes a worm shaft insertion hole 111*a* for entry of a front end side of the worm shaft 140 and is at least partially embedded with the front end side of the worm shaft 140.

The first bearing receiving portion 112 is formed extending to a rear side of the worm shaft insertion hole 111*a*, and may be provided with a diameter greater than a diameter of the worm shaft insertion hole 111*a*. The first bearing receiving portion 112 may be provided with a diameter equal to or similar to an outer diameter of a first bearing 143 to which the first bearing 143 to be described later may be coupled. Furthermore, the first bearing receiving portion 112 may include a step portion 112*a* disposed between the worm shaft insertion hole 111*a* to prevent contact with an inner ring 143*b* of the first bearing 143. Accordingly, the first bearing 143 may be supported by the first bearing receiving portion 112 on a front side and an outer circumferential surface of an outer ring 143*a*, respectively.

The worm shaft support engagement 113 is formed extending to a rear side of the first bearing receiving portion 112, and may be provided with a diameter equal to or greater than the diameter of the first bearing receiving portion 112. Further, the worm shaft support engagement 113 may be formed with a rear side protruding to the back surface of the front housing 110, and a female thread 113*a* may be formed on an inner circumferential surface. In this case, a root diameter of the female thread 113*a* disposed on the inner circumferential surface of the worm shaft support engagement 113 may be provided equal to or greater than the diameter of the first bearing receiving portion 112.

The second bearing receiving portion 114 is formed extending to a front side of the worm shaft engagement 111, and may be provided with a diameter less than the diameter of the worm shaft insertion hole 111*a*. The second bearing receiving portion 114 may be provided with the diameter equal to or less than an outer diameter of a second bearing 144 to which the second bearing 144 to be described later may be press-fittingly coupled. Furthermore, the second bearing 144 may be supported by the second bearing receiving portion 114 on a front side and an outer circumferential surface, respectively, as the front side is closed by the front housing 110.

The cylinder portion 115 is formed extending to the lower side of the worm shaft engagement 111, and may be in a cylinder rod form with opposite ends disposed transversely to the lower side of the worm shaft engagement 111 as a whole. Furthermore, the cylinder portion 115 includes a gear hole 115*a* disposed to communicate with the worm shaft engagement 111 on an inner side, and an opening through which an actuating piston 163 to be described later is arranged to be moved forward and backward, respectively, on opposite end sides.

Additionally, the worm shaft engagement 111 and the cylinder portion 115 may be integrally formed with the front housing 110 as shown in FIG. 4, but it is also possible to have a separate housing integrally formed with the worm shaft engagement 111 and the cylinder portion 115 to be configured to engage the front housing 110.

The rear housing 120 is provided with a motor embedded portion 121 protruding from the rear side, which is engaged with the front housing 110 to form an internal space. Here, the motor embedded portion 121 may be disposed on one side of the worm shaft engagement 111 without overlapping the worm shaft engagement 111 when viewed from the front.

The rear housing 120 may further include a worm shaft receiving recess 122 configured to receive a rear end side of the worm shaft 140. The rear housing 120 may also include a sealing member 123 on an engagement surface with the front housing 110 to prevent external moisture or dust from entering an interior space of the housing when engaged with the front housing 110. Hereinafter, the term housing includes the front housing 110 and the rear housing 120.

The motor 130 may be a variety of motors known in the art, including brushless motors and the like, and may include a first gear 131 embedded in the motor embedded portion 121 with a rotor facing forward, and arranged on the rotor. Accordingly, a rotational force of the motor 130 is output through the first gear 131. In this case, the first gear 131 may be a spur gear or a helical gear or the like.

The worm shaft 140 is formed in a substantially circular rod shape, and is embedded in the worm shaft engagement 111, including a second gear 141 arranged to rotate in engagement with the first gear 131 at a rear end side, and a worm 142 disposed on an upper side of the gear hole 115*a*. In this case, the rear end side of the worm shaft 140 is positioned toward the worm shaft receiving recess 122 arranged in the rear housing 120, and the front side of the worm shaft 140 is positioned toward the second bearing receiving portion 114.

The second gear 141 may be arranged as a spur gear or a helical gear or the like, the same as the first gear 131, so as to be rotatable in engagement with the first gear 131 as described above. Furthermore, the second gear 141 is fixed between a support member 141*a* provided on the rear end side of the worm shaft 140 and a locking nut 141*b* engaged from the rear end and is arranged to rotate with the worm shaft 140. The worm shaft 140 may further include a first press-fit protrusion 1141*c* arranged on an outer circumferential surface so that the second gear 141 can be press-fittingly fixed into the outer circumferential surface to prevent idling of the second gear 141. Accordingly, the worm shaft 140 may rotate with the second gear 141 by receiving the rotational force transmitted by the first gear 131 from the motor 130.

A worm 142 is positioned on the upper side of the gear hole 115*a* within the worm shaft engagement 111, as described above. In this case, an axial length of the worm 142 may be provided equal to or less than a length from a front end to a rear end of the gear hole 115*a*.

Meanwhile, the worm shaft 140 further includes a first bearing 143 and a second bearing 144, which are coupled to the first bearing receiving portion 112 and the second bearing receiving portion 114, respectively, as described above.

The first bearing 143 may comprise a ball bearing disposed in the first bearing receiving portion 112 such that a front side and an outer circumferential side of an outer ring 143*a* are each supported by the first bearing receiving portion 112, and an inner ring 143*b* is press-fittingly secured to the outer circumferential side of the worm shaft 140 to rotate with the worm shaft 140. To this end, the worm shaft 140 may further include a second press-fit protrusion 143*c* that is press-fittingly coupled to an inner circumferential surface of the first bearing 143. Accordingly, the first bearing 143 may minimize a decrease in rolling efficiency of the first bearing 143 as the outer ring 143*a* side does not need to be press fittingly coupled to the first bearing receiving portion 112.

The second bearing 144 may be provided as a needle roller bearing with an omitted inner ring for smooth support of the worm shaft 140, which has a relatively narrow second bearing receiving portion 114 and is subjected to relatively large forces on its front end side by the worm 142. More specifically, the second bearing 144 may include a cylindrical roller bearing with a body 144*a* press-fittingly secured to the second bearing receiving portion 114 and a plurality of rollers 144*b* arranged to support an outer circumferential surface of the front end side of the worm shaft 140. In this case, a rotational axis of the rollers 144*b* may be arranged parallel to a rotational axis of the worm shaft 140, as shown in FIG. 1.

Accordingly, the worm shaft 140 is able to rotate smoothly by receiving the rotational force output from the motor 130 transmitted from the first gear 131 to the second gear 141 and is supported by the first bearing 143 and the second bearing 144 coupled to the first bearing receiving portion 112 and the second bearing receiving portion 114, respectively.

The worm shaft support 150 may have a substantially annular shape and may include a male thread 151 disposed on an outer circumferential surface for engagement with a female thread 113*a* on an inner circumferential surface of the worm shaft support engagement 113, and an assembly recess 152 disposed on the inner circumferential surface for insertion of a tool or the like for rotating the worm shaft support 150 from the worm shaft support engagement 113 for screw engagement. Here, the assembly recesses 152 may be arranged in a plurality radially on the inner circumferential side as shown in FIG. 4, but the shape or number may be changed depending on the shape of variously shaped tools or the like for rotating the worm shaft support 150 from the worm shaft support engagement 113.

Furthermore, the worm shaft support 150 is provided with an inner diameter greater than an outer diameter of the inner ring 143*b* of the first bearing 143, as illustrated in FIG. 4, to support the outer ring 143*a* of the first bearing 143 at a rear side, but not in contact with the inner ring 143*b* side of the first bearing 143 that rotates with the worm shaft 140. Accordingly, the worm shaft support 150 supports the rear side of the outer ring 143*a* of the first bearing 143 to prevent the first bearing 143 from being disengaged from the worm shaft engagement 111 along with the worm shaft 140 to the rear side by an axial load.

Accordingly, the actuator unit 100 according to the present embodiment can prevent the first bearing 143 from being disengaged from the housing along with the worm shaft 140 by the axial load, as well as prevent the rolling efficiency of the first bearing 143 from decreasing by eliminating the need for a relatively strong press-in force that was provided to prevent the first bearing 143 from being disengaged from the first bearing receiving portion 112.

Meanwhile, the actuating portion 160 is provided, partially embedded in the cylinder portion 115 except for the opposite end sides, as a means for converting rotational motion output from the motor 130 and transmitted to the worm shaft 140 into linear motion in a radial direction on the opposite sides of the worm shaft 140 as described above.

More specifically, the actuating portion 160 may include a worm wheel 161 that rotates in engagement with the worm 142, an actuating rod 162 that rotates with the worm wheel 161, and a pair of actuating pistons 163 that are respectively moved forward and backward toward openings provided on opposite sides of the cylinder portion 115 by rotation of the actuating rod 162.

The worm wheel 161 is positioned at a lower side of the gear hole 115*a* and protrudes at the upper side of the gear hole 115*a* such that a portion of an upper side of the worm wheel 161 may engage the worm 142. In this case, a rotational axis of the worm wheel 161 is arranged to intersect an imaginary axis downwardly parallel to the rotational axis of the worm shaft 140.

The actuating rod 162 is substantially a rod shape passing through a center axis of the worm wheel 161, and may be polygonal in cross-section to prevent idling with the worm wheel 161.

The actuating pistons 163 may be disposed on opposite end sides of the actuating rod 162 and may be arranged to be spaced apart or closer together in opposite directions depending on a rotational direction of the actuating rod 162, and may further include various configurations and structures known in the art.

For example, the actuating rod 162 may be arranged with screws on both outer circumferential surfaces and the actuating pistons 163 may be formed with a thread engaging the screws of the actuating rod 162 on the inner circumferential surface, and a structure such as a protrusion that prevents rotation of the actuating piston 163 may be provided on the outer circumferential surface of the cylinder portion 115 so that the actuating pistons 163 may be moved forward and backward in opposite directions of the cylinder portion 115 as the actuating rod 162 rotates. Accordingly, the actuating pistons 163 can be moved away from or toward opposite sides of the cylinder portion 115 depending on the rotational direction of the worm wheel 161. In addition, the actuating pistons 163 may include a blocking member 163*a*, which is provided with a rubber material or the like, between an outer circumferential surface of the actuating piston 163 and an outer circumferential surface of the opening side of the cylinder portion 115 to prevent dust or the like from entering the cylinder portion 115.

The PCB 170 is a substrate on which a processor, memory, or the like for controlling the motor 130 and the like is mounted and is provided between the worm shaft support 150 and the second gear 141, as illustrated in FIG. 3. Accordingly, the PCB 170 may include a worm shaft through-hole 171 for avoiding the worm shaft 140 and a terminal portion 172 provided for inputting or outputting power or control signals to the PCB 170 or a motor, etc.

Figure 5:
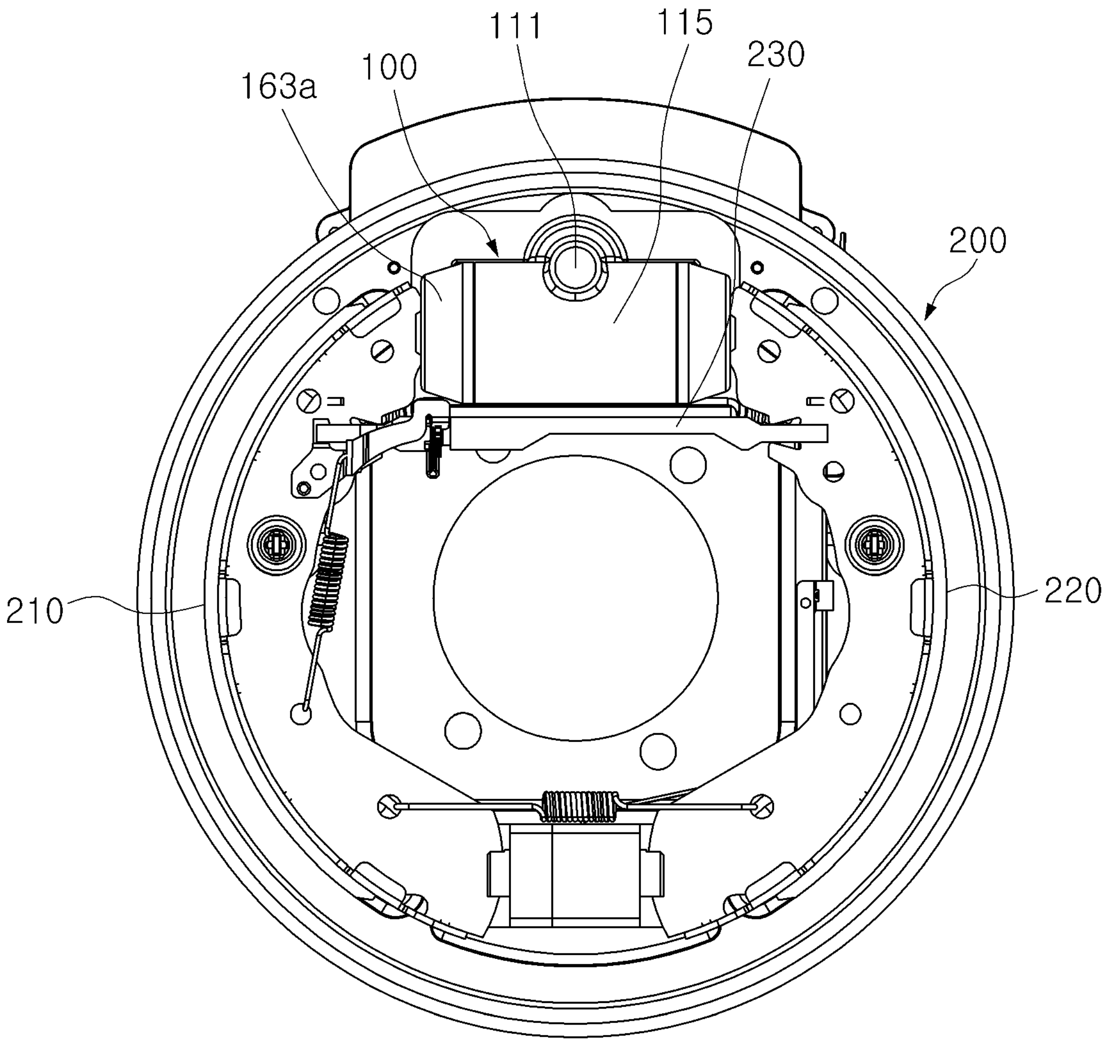
FIG. 5 is a front view illustrating an assembled state of an electro-mechanical drum brake including an actuator unit according to one embodiment of the present disclosure.

Meanwhile, FIG. 5 is a front view illustrating an assembled state of an electro-mechanical drum brake including an actuator unit according to one embodiment of the present disclosure.

Referring to FIGS. 1 to 5, an electromechanical drum brake including an actuator unit according to one embodiment of the present disclosure includes a pair of brake shoes 210, 220 disposed on a backplate 200 and moving forward and backward toward an inner circumferential side of a drum (not shown), and at least one elastic member 230 disposed between the actuator unit 100 and the brake shoes 210, 220 to move the brake shoes 210, 220 forward and backward to opposite sides. Here, the actuator unit 100 includes the front housing 110 and the rear housing 120, the motor 130, the worm shaft 140, the worm shaft support 150, the actuating part 160, and the PCB 170, as described above, and a detailed description thereof will be omitted.

The worm wheel 161 rotates in engagement with the worm 142 provided on the front end side of the worm shaft 140. At this time, the rotational axis of the worm wheel 161 is arranged to be orthogonal to an imaginary axis parallel to the rotational axis of the worm shaft 140. Further, the rotational direction of the worm wheel 161 can be forward or reverse rotation depending on the rotational direction of the worm shaft 140. At this time, the worm shaft support 150 can prevent the worm shaft 140 from being disengaged from the housing along with the first bearing 143 by an axial load applied to the worm shaft 140 in accordance with the rotational force of the worm 142 and the worm wheel 161 in engagement.

On the other hand, the brake shoes 210, 220 can be brought into contact with the inner circumferential side of the drum by the actuating pistons 163, which move away to opposite sides as the worm wheel 161 rotates in one direction, to provide braking force to the drum. Conversely, as the worm wheel 161 rotates in the other direction, the brake shoes 210, 220 may be spaced apart from the inner circumferential side of the drum by the actuating pistons 163 moving to move closer to opposite sides, thereby releasing the braking force provided to the drum.

While specific embodiments of the actuating unit of the present disclosure and the electro-mechanical drum brake including the same have been described herein, it will be appreciated that many embodiment variations are possible without departing from the scope of the present disclosure.

Therefore, the scope of the present disclosure should not be limited to the described embodiments, but should be defined not only by the following claims, but also by those equivalents of these claims.

In other words, the described embodiments are to be understood as exemplary and not limiting in all respects, and the scope of the present disclosure is to be indicated by the claims of the following application rather than by their detailed description, and the meaning and scope of the claims and all modifications or variations derived from the concepts of equivalents thereof are to be construed as being included in the scope of the present disclosure.

What is claimed is:

1. An actuator unit comprising:

a front housing including a worm shaft housing portion having a worm shaft insertion hole on a rear surface of the front housing and protruding in a forward direction from the front housing, a first bearing housing portion extending in a rearward direction from the worm shaft insertion hole, a worm shaft support engagement portion extending in the rearward direction from the first bearing housing portion, and a cylinder portion disposed under the worm shaft housing portion;

a motor;

a rear housing accommodating the motor therein and coupled with the front housing;

a worm shaft operably coupled with a first bearing disposed between an outer circumferential surface of the worm shaft and the first bearing housing portion of the front housing, the worm shaft having a worm disposed at a front end portion of the worm shaft and rotatably coupled to the worm shaft housing portion and configured to be rotatable by a rotational force from the motor;

a pair of pistons movably disposed in the cylinder portion of the front housing and configured to be movable in opposite directions to each other by a worm wheel rotatably engaged with the worm to transmit the rotational force from the worm; and a worm shaft support coupled to the worm shaft support engagement portion of the front housing to support the rear surface of the first bearing.

2. The actuator unit of claim 1, wherein:

the front housing further includes a second bearing housing portion extending in the forward direction from the worm shaft housing portion, and the worm shaft is operably coupled with a second bearing disposed between the outer circumferential surface of the front end portion of the worm shaft and the second bearing housing portion.

3. The actuator unit of claim 2, wherein the second bearing includes a cylindrical roller bearing including a body press-fittingly fixed into the second bearing housing portion of the front housing, and a plurality of rollers rotatably supporting the outer circumferential surface of the front end portion of the worm shaft.

4. The actuator unit of claim 1, wherein the first bearing includes a ball bearing including an outer ring fixed to the first bearing housing portion of the front housing, and an inner ring fixed to the outer circumferential surface of the worm shaft to rotate with the worm shaft.

5. The actuator unit of claim 4, wherein the worm shaft further includes a press-fit protrusion on the outer circumferential surface of the worm shaft to which the inner ring of the first bearing is fixed.

6. The actuator unit of claim 4, wherein the first bearing housing portion of the front housing includes a stepped portion such that the first bearing housing portion does not contact a front surface of the inner ring of the first bearing.

7. The actuator unit of claim 4, wherein the worm shaft support is arranged to contact a rear surface of the outer ring of the first bearing to support the first bearing and not to contact a rear surface of the inner ring of the first bearing.

8. The actuator unit of claim 7, wherein the worm shaft support includes a thread formed on an outer circumferential surface of the worm shaft support to be engaged with a thread formed on an inner circumferential surface of the worm shaft support engagement portion of the front housing, and the worm shaft support is screwedly engaged with the worm shaft support engagement portion of the front housing.

9. The actuator unit of claim 8, wherein the worm shaft support further includes an assembly recess formed on an inner circumferential surface of the worm shaft support and configured to receive a tool for engaging the worm shaft support with the worm shaft support engagement portion of the front housing.

10. The actuator unit of claim 1, wherein the rear housing further includes a worm shaft receiving recess configured to receive a rear end portion of the worm shaft.

11. The actuator unit of claim 1, wherein a first gear configured to be rotatable by the rotational force of the motor is coupled to a rotor of the motor, and a second gear is disposed at a rear portion of the worm shaft and rotatably engages the first gear.

12. The actuator unit of claim 11, wherein the second gear is press-fittingly engaged into another press-fit protrusion located on the outer circumferential surface of the worm shaft, and is fixed between a support positioned on the outer circumferential surface of the worm shaft and a locking nut coupled to a rear end portion of the worm shaft.

13. The actuator unit of claim 11, further comprising a printed circuit board (PCB) disposed between a rear side of the worm shaft support and a front side of the first gear, wherein the PCB includes a worm shaft through-hole spaced apart from the outer circumferential surface of the worm shaft.

14. The actuator unit of claim 1, wherein the cylinder portion of the front housing includes a gear hole in which an upper side portion of the worm wheel is disposed to engage the worm.

15. An electro-mechanical drum brake with a pair of brake shoes and configured to be movable forward or backward with respect to an inner circumferential side of a drum, the electro-mechanical drum brake comprising:

an actuator unit configured to move the brake shoes forward and backward in opposite directions to each other; and at least one elastic member disposed between the pair of brake shoes;

wherein the actuator unit includes:

a worm shaft operably coupled to a bearing disposed between an outer circumferential side of the worm shaft and a housing of the actuator, wherein the worm shaft has a worm disposed at a front end portion of the worm shaft and is configured to be rotatable by a rotational force output from a motor;

a piston configured to be rotatable by a worm wheel rotatably engaged with the worm to transmit a rotational force from the worm to move the brake shoes forward or backward; and a worm shaft support fixed to the housing to support a rear surface of the bearing, wherein the worm shaft support is screwedly engaged with the housing by a thread formed on the outer circumferential surface of the worm shaft support.

16. The electro-mechanical drum brake of claim 15, wherein the bearing includes a ball bearing including an outer ring secured between the housing and the worm shaft support, and an inner ring fixed to an outer circumferential surface of the worm shaft to rotate with the worm shaft.

17. The electro-mechanical drum brake of claim 15, wherein the worm shaft is coupled with an other bearing disposed between an outer circumferential surface of the front end portion of the worm shaft and the housing.

18. The electro-mechanical drum brake of claim 17, wherein the other bearing includes a cylindrical roller bearing including a body press-fittingly fixed into the housing, and a plurality of rollers rotatably supporting the outer circumferential surface of the front end portion of the worm shaft.

19. The electro-mechanical drum brake of claim 15, wherein the worm shaft support further includes an assembly recess formed on an inner circumferential surface of the worm shaft support and configured to receive a tool for engaging the worm shaft support with the housing.

* * * * *